(12) United States Patent
Winey et al.

(10) Patent No.: US 7,285,591 B2
(45) Date of Patent: Oct. 23, 2007

(54) POLYMER-NANOTUBE COMPOSITES, FIBERS, AND PROCESSES

(75) Inventors: Karen Irene Winey, Philadelphia, PA (US); Reto Haggenmueller, Philadelphia, PA (US); Fangming Du, Upper Darby, PA (US); Wei Zhou, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 191 days.

(21) Appl. No.: 10/805,705

(22) Filed: Mar. 22, 2004

(65) Prior Publication Data

US 2007/0213450 A1    Sep. 13, 2007

Related U.S. Application Data

(60) Provisional application No. 60/456,162, filed on Mar. 20, 2003.

(51) Int. Cl.
*C08K 3/34*      (2006.01)
(52) U.S. Cl. .............. 524/495; 264/172.15; 264/210.6; 521/61; 524/496
(58) Field of Classification Search ................ 524/495, 524/496; 521/61; 264/210.6, 172.15
See application file for complete search history.

(56) References Cited

U.S. PATENT DOCUMENTS

| | | | | |
|---|---|---|---|---|
| 5,130,342 | A * | 7/1992 | McAllister et al. ............ | 521/61 |
| 5,908,585 | A   | 6/1999 | Shibuta ....................... | 252/506 |
| 6,544,463 | B1  | 4/2003 | Luzzi ......................... | 264/346 |
| 6,576,341 | B1  | 6/2003 | Davey et al. ................ | 428/376 |
| 6,617,377 | B2  | 9/2003 | Chacko ....................... | 524/99 |
| 6,645,455 | B2  | 11/2003 | Margrave et al. ......... | 423/447.1 |
| 6,689,835 | B2  | 2/2004 | Amarasekera et al. ...... | 524/495 |
| 6,764,628 | B2 * | 7/2004 | Lobovsky et al. ...... | 264/172.15 |
| 6,900,264 | B2 * | 5/2005 | Kumar et al. ................ | 524/495 |
| 7,001,556 | B1 * | 2/2006 | Shambaugh ............. | 264/210.6 |
| 2002/0046872 | A1 | 4/2002 | Smalley et al. ......... | 174/137 A |
| 2002/0048632 | A1 | 4/2002 | Smalley et al. ............. | 427/230 |
| 2002/0058743 | A1 | 5/2002 | Tobita et al. ................ | 524/495 |
| 2002/0068170 | A1 | 6/2002 | Smalley et al. ............. | 428/403 |
| 2002/0085968 | A1 | 7/2002 | Smalley et al. ............. | 422/198 |
| 2002/0090331 | A1 | 7/2002 | Smalley et al. ............. | 422/198 |

(Continued)

FOREIGN PATENT DOCUMENTS

EP    1 054 036 A1    11/2000

(Continued)

OTHER PUBLICATIONS

Reto Haggenmueller, oral slide presentation, "SWNT—Thermoplastic Composites", Annual Meeting of the American Physical Society, Seattle, Washington, Mar. 15, 2001.

(Continued)

*Primary Examiner*—David W. Wu
*Assistant Examiner*—Henry S. Hu
(74) *Attorney, Agent, or Firm*—Woodcock Washburn LLP

(57) ABSTRACT

Disclosed are processes for preparing nanotube composite materials and fibers that provide exceptional nanotube alignment and dispersion. The disclosed processes include contacting nanotube dispersions with polymer melts. Also disclosed are nanotube composite fibers having high nanotube concentrations, exceptional nanotube alignment, and high thermal conductivity.

45 Claims, 6 Drawing Sheets

U.S. PATENT DOCUMENTS

| | | | |
|---|---|---|---|
| 2002/0090501 A1 | 7/2002 | Tobita | 428/297.4 |
| 2002/0113335 A1 | 8/2002 | Lobovsky et al. | 264/184 |
| 2002/0150524 A1 | 10/2002 | Smalley et al. | 422/198 |
| 2002/0161101 A1 | 10/2002 | Carroll et al. | 524/495 |
| 2002/0185770 A1 | 12/2002 | McKague | 264/108 |
| 2002/0197923 A1 | 12/2002 | Tobita et al. | 442/74 |
| 2003/0026754 A1 | 2/2003 | Clarke et al. | 423/447.2 |
| 2003/0077515 A1 | 4/2003 | Chen et al. | 429/231.8 |
| 2003/0122111 A1 | 7/2003 | Glatkowski | 252/500 |
| 2003/0151030 A1 | 8/2003 | Gurin | 252/502 |
| 2003/0158323 A1 | 8/2003 | Connell et al. | 524/495 |
| 2003/0164427 A1 | 9/2003 | Glatkowski et al. | 244/158 R |
| 2003/0170167 A1 | 9/2003 | Nikolaev et al. | 423/447.1 |
| 2003/0180526 A1 | 9/2003 | Winey et al. | 428/323 |
| 2003/0216502 A1 | 11/2003 | McElrath et al. | 524/507 |
| 2003/0236588 A1 | 12/2003 | Jang et al. | 700/119 |
| 2004/0024428 A1 | 2/2004 | Barrett et al. | 607/58 |
| 2004/0029706 A1 | 2/2004 | Barrera et al. | 501/99 |

FOREIGN PATENT DOCUMENTS

| | | |
|---|---|---|
| EP | 1 260 619 A1 | 11/2002 |
| EP | 1 336 672 | 8/2003 |
| WO | WO 01/30694 A1 | 5/2001 |
| WO | WO 01/92381 A1 | 12/2001 |
| WO | WO 02/080195 A1 | 10/2002 |
| WO | WO 03/060941 A2 | 7/2003 |
| WO | WO 03/078317 A1 | 9/2003 |
| WO | WO 03/080513 A2 | 10/2003 |
| WO | WO 2004/024428 A1 | 3/2004 |

OTHER PUBLICATIONS

Karen I. Winey, oral slide presentation, "Alignment and Dispersion of Single-Wall Nanotubes in Polymer Composites", Annual Meeting of the Materials Research Society, Boston, Massachusetts, Nov. 27, 2001.

Reto Haggenmueller, oral slide presentation, "Nanotubes in Amorphous and Semicrystalline Polymers", Annual Meeting of the American Physical Society, Indianapolis, Indiana, Mar. 18, 2001.

Fangming Du, oral slide presentation, "Single-Walled Carbon Nanotube/PMMA Composites", Annual Meeting of the American Physical Society, Austin, Texas, Mar. 6, 2003.

Reto Haggenmueller, oral slide presentation, "Fabrication and Properties of Single Walled Carbon Nanotube—Polymer Composites", University of Pennsylvania Engineering Research Symposium, Philadelphia, Pennsylvania, Feb. 20, 2003.

Reto Haggenmuller, poster presentation, "SWNT—Thermoplastic Composites, Production and Characterization", Rice University, Houston, Texas, Jul. 9, 2001.

Reto Haggenmueller, poster presentation, "Fabrication and Properties of Single Walled Carbon Nanotube—Semicrystalline Polymer Composites", Annual Meeting of the American Physical Society, Austin, Texas, Mar. 6, 2003.

Karen I. Winey, oral slide presentation, "Nanotube-Polymer Composites", National Institute of Standarads and Technology, Gaithersburg, Maryland, May 16, 2002.

Ajayan, P.M., et al., "Single-walled carbon nanotube-polymer composites: strength and weakness," Adv. Mater., 2000, 12(10), 750-753.

Andrews, R., et al., "Nanotube composite carbon fibers," Appl. Phys. Letts., 1999, 75(9), 1329-1331.

Barraza, H.J., et al., "SWNT-filed thermoplastic and elastomeric composites prepared by miniemulsion polymerization," NANO Letts., 2002, 2(8), 797-802.

Bhattacharyya, A.R., et al., "Crystallization and orientation studies in polypropylene/single wall carbon nanotube composite," Polymer, 2003, 2373-2377.

Biercuk, M.J., et al., "Carbon nanotube composites for thermal management," Appl. Phys. Letts., 2002, 80(15), 2767-2769.

Brandrup, et al. (Eds.), "Solution Properties," Polymer Handbook, $3^{rd}$ Ed., Wiley Interscience, NY, 1989, Chapter VIII.

Choi, E.S., et al., "Enhancement of thermal and electrical properties of carbon nanotube polymer composites by magnetic field processing," J. of Applied Physics, 2003, 94(9), 6034-6039.

Colbert, D.T., "Single-wall nanotubes: a new option for conductive plastics and engineering polymers," Plastics Additives & Compounding, Jan./Feb. 2003, 7 pages.

Cooper, C.A., et al., "Distribution and alignment of carbon nanotubes and nanofibrils in a polymer matrix," Composites Science and Technology, 2002, 62, 1105-1112.

Du, F., et al., "[W26.004] Single-walled carbon nanotube/PMMA composites," FOCUS Session: Carbon Nanotube Composites, 2003, Session W26, 1 page (abstract).

Fisher, F.T., et al., "Effects of nanotube waviness on the modulus of nanotube-reinforced polymers," Appl. Phys. Lett., 2002, 80(24), 4647-4649.

Hadjiev, V.G., et al., "Raman scattering test of single-wall carbon nanotube composites," Appl. Phys. Lett., 2001, 78(21), 3193-3195.

Girifalco, L.A., et al., "Carbon nanotubes, buckyballs, ropes, and a universal graphitic potential," Am. Physical Soc., Physical Review B, 2000, 62(19), 13 104-13 110.

Haggenmueller, R., et al., "Aligned single-wall carbon nanotubes in composites by melt processing methods," Chem. Phys. Lett., 2000, 330, 219-225.

Haggenmueller, R., et al., "[W26.008] Single-walled carbon nanotube/nylon66 composites," Session W26—Focus Session: Carbon Nanotube Composites, 2003, W26.008, 1 page (abstract).

Haggenmueller, R., et al., "[D9.001] Single-walled carbon nanotube/semicrystalline polymer composite fibers," Session D9—Focus Session: Nanostructures in Polymers I, 2002, D9.001, 1 page (abstract).

Haggenmueller, R., et al., "[V18.004] Processing and characterization of polymers containing single-wall carbon nanotubes," Session V18—Nanoparticles, Oral Session, 2001, V18.004, 1 page (abstract).

Haggenmueller, R., "[M10.002] Thermoplastic/nanotube composite fibers," Session M10—Nanotubes and Related Materials: Applications, Oral Session, 2000, M10.002, 1 page (abstract).

Haggenmuller, R., et al., "Single-walled carbon nanotube/polymer composite fibers," Univ. of Penn., 2001, MRS, 1 page (abstract).

Haggenmueller, R., et al., "Mechanical and structural investigation of highly aligned single-walled carbon nanotubes in polymer composites," Univ. of Penn., 2002, MRS, 1 page (abstract).

Haggenmueller, R., et al., "Production and characterization of polymer nanocomposites with highly aligned single-walled carbon nanotubes," J. of Nanoscience & Nanotechnology, 2003, 3(1), 1-6.

Halford, B., "Acid route to nanotube fibers," Chemical & Engineering News, 2003, 81(5), p. 9; http://pubs.acs.org/cen/topstory, 2 pages.

Halpin, J.C., et al., "The Halpin-Tsai equations: a review," Polymer Eng. Sci., 1976, 16(5), 344-352.

Hwang, J., et al., "Polarized spectroscopy of aligned single-wall carbon nanotubes," Phys. Rev. B, 2000, 62(20), R13 310-R13-313.

Islam, M.F., et al., "High weight feraction surfactant solubilization of single-wall carbon nanotubes in water," Nano Letts., 3(2), 269-273.

Jin, L., et al., "Alignment of carbon nanotubes in a polymer matrix by mechanical stretching," Appl. Phys. Lett., 1998, 73(9), 1197-1199.

Kashiwagi, T., "Thermal degradation and flammability properties of poly(propylene)/carbon nanotube composites," Macromol, Rapid Commun., 2002, 23, 761-765.

Kelsey, W.D., "reu Program Final Report," Aug. 2000, http://www.mse.arizona.edu/~reu-ret/pastreureports_1.htm, downloaded Feb. 24, 2004, 1-9.

Kim, P., et al., "Thermal transport measurements of individual multiwalled nanotubes," Phys. Rev. Lett., 2001, 87(21), 215502-1-215502-4.

Kim, B., et al., "Electrical properties of single-wall carbon nanotube and epoxy composites," J. of Applied Physics, 2003, 94(10), 6724-6728.

Li, F., et al., "Tensile strength of single-walled carbon nanotubes directly measured from their macroscopic ropes," Appl. Phys. Lett., 2000, 77(20), 3161-3163.

Liang, Z., et al., "Investigation of molecular interactions between (10, 10) single-walled nanotube and epon 862 resin/DETDA curing agent molecules," *Materials Science and Engineering*, 2004, A365, 228-234.

Mallick, P.K., "Fiber-reinforced composites," *Marcel Dekker, Inc.*, 1993.

Nikolaev, P., et al., "Gas-phase catalytic growth of single-walled carbon nanotubes from carbon monoxide," *Chem. Phys. Lett.*, 1999, 313, 91-97.

Park, C., et al., "Dispersion of single wall carbon nanotubes by in situ polymerization under sonication," *Chem. Phys. Letts.*, 2002, 364, 303-308.

Pötschke, P., et al., "Rheological behavior of multiwalled carbon nanotube/polycarbonate composites," *Polymer*, 2002, 43, 3247-3255.

Qian, D., et al., "Load transfer and deformation mechanisms in carbon nanotube-polystyrene composites," *Appl. Phys. Lett.*, 2000, 76(20), 2868-2870.

Ramasubramaniam R., et al., "Homogeneous carbon nanotube/polymer composites for electrical applications," *Appl. Phys. Letts.*, 2003, 83(14), 2928-2930.

Rutkofsky, M., et al., "Using a carbon nanotube additive to make electrically conductive commercial polymer composites," *Zyvex Appln. Note*, www.zyvex.com, publication date unknown, 3 pages.

Sandler, J., et al., "Development of a dispersion process for carbon nanotubes in an epoxy matrix and the resulting electrical properties," *Polymer*, 1999, 40, 5967-5971.

Sandler, J.K.W., et al., "Ultra-low electrical percolation threshold in carbon-nanotube-epoxy composites," *Polymer*, 2003, 44, 5893-5899.

Salvetat, J.P., et al., "Elastic and shear moduli of single-walled carbon nanotube ropes," *Phys. Rev. Lett.*, 1999, 82(5), 944-947.

Schueler, R., et al., "Agglomeration and electrical percolation behavior of carbon black dispersed in epoxy resin," *J. Appl. Polym. Sci.*, 1997, 63, 1741-1746.

Shaffer, M.S., et al., "Fabrication and characterization of carbon nanotube/poly(vinyl alcohol) composites," *Adv. Mater.*, 1999, 11(11), 937-941.

Stéphan, C., et al., "Electrical properties of singlewalled carbon nanotubes-PMMA composites," *Am. Inst. Of Physics*, 2000, 363-366.

Thostenson, E.T., et al., "Aligned multi-walled carbon nanotube-reinforced composites: processing and mechanical characterization," *J. of Physics D: Applied Physics*, 2002, 35, L77-L80.

Valentini, L., "Morphological characterization of single-walled carbon nanotubes-PP composites," *Composites Science and Technology*, 2003, 63, 1149-1153.

Wong, E.W., et al., "Nanobeam mechanics: elasticity, strength, and toughness of nanorods and nanotubes," *Science*, 1997, 277, 1971-1975.

Wood, J.R., et al., "Orientation of carbon nanotubes in polymers and its detection by raman spectroscopy," *Composites: Part A*, 2001, 32, 391-399.

Yu, M.F., et al., "Tensile loading of ropes of single wall carbon nanotubes and their mechanical properties," *Phys. Rev. Lett.*, 2000, 84(24), 5552-5555.

http://www.aps.org/meet/MAR02/baps/tocD.html, "Program Overview," Monday Afternoon Session, Mar. 18, 2002, downloaded Mar. 15, 2004, 1-30.

http://www.aps.org/meet/MAR03/baps/abs/S8260.html, "Focus Session: Carbon Nanotube Composites," Thursday Morning, Mar. 6, 2003, downloaded Feb. 26, 2004, 1-3.

* cited by examiner

POLYMER-NANOTUBE COMPOSITES, FIBERS, AND PROCESSES

CROSS REFERENCE TO RELATED APPLICATIONS

This application claims the benefit of U.S. Provisional Application No. 60/456,162, filed Mar. 20, 2003, the entirety of which is incorporated by reference herein.

GOVERNMENT RIGHTS

The invention was made with U.S. Government support. The Government may have certain rights in the invention under one or more of Office of Naval Research Grants Nos. N00014-00-1-0720, R13572-41600001, and N00014-3-1-0890.

FIELD OF THE INVENTION

The present invention is related to the field of processing composite materials. The present invention is also related to composite materials containing nanotubes. The present invention also relates to processes of preparing composite materials and fibers having highly aligned single-walled carbon nanotubes.

BACKGROUND OF THE INVENTION

Carbon nanotubes have attracted considerable attention and generated intense research activities on nanotubes and their composites with polymers. The interest in this extraordinary carbon form is based on exceptional mechanical, electrical, and thermal properties. (Yu, M. F. et al., Phys. Rev. Lett. (2000), 84, 5552; Li, F. et al., Appl. Phys. Lett. (2000), 77, 3161; Wong, E. W., et al., Science (1997), 277, 1971; Kim, P., et al., Phys. Rev. Lett. (2001), 87, 215502.) These properties combined with the very high aspect ratio make nanotubes an excellent candidate for novel composite materials that can be used in a wide variety of transportation, aerospace, energy and electronics applications.

Several recent studies focus on the fabrication and characterization of carbon nanotube—polymer nanocomposites (Shaffer, M. S. et al., Adv. Mater. (1999), 11, 937; Qian, D. et al., Appl. Phys. Lett. (2000), 76, 2868; Ajayan, P. M. et al., Adv. Mater. (2000), 12, 750; Hadjiev, V. G. et al., Appl. Phys. Lett. (2001), 78, 3193; Haggenmueller, R. et al., Chem. Phys. Lett. (2000), 330, 219; Jin, L. et al., Appl Phys. Lett. (1998), 73, 1197; and Wood, J. R. et al., Comp. A (2001), 32, 391). For example, a solvent-evaporation method was applied for multiwall carbon nanotube-polystyrene composites with enhanced mechanical properties (Qian et al.). In this study, the modulus of a 1 weight percent ("wt %") MWNT-polystyrene composite was within ~10% of a theoretical prediction incorporating dispersion and effective load transfer parameters from the matrix to the nanotubes. In other studies, the orientation of nanotubes has been shown to influence the electrical, thermal, and mechanical properties of composite materials. For example, using 2-D X-ray diffraction to measure the alignment of nanotubes, Jin et al. showed that the full width at half maximum (FWHM) of a mechanically stretched 50 wt % MWNT-poly(hydroxy aminoether) composite was 46.4° (Id.). In another study involving the use of Raman spectroscopy, Wood et al. showed a correlation between deformation and alignment of a thermoset composite that was sheared before curing.

Although nanotube alignment influences various properties of composite materials, many of the various methods used to prepare these composites do not adequately disperse the carbon nanotubes. For example, melt mixing single walled carbon nanotubes ("SWNTs") with polymer matrix materials in dry form leads to SWNT agglomerates that are difficult to disperse. Likewise, concentrated nanotube-polymer materials ("masterbatches") typically contain agglomerated nanotubes that are also difficult to disperse using standard polymer melt processing techniques. Thus, there is a continuing need to provide composite materials and fibers having highly aligned and dispersed carbon nanotubes. There is also a continuing need to provide polymer composite materials and fibers having improved physical properties, such as having high thermal conductivities.

SUMMARY OF THE INVENTION

In one aspect of the present invention there are provided processes including providing a nanotube dispersion comprising a plurality of nanotubes and a liquid; contacting the nanotube dispersion with a polymer melt; and mixing the nanotube dispersion with the polymer melt to provide a nanotube composite melt. Also provided are compositions prepared according to the processes of this aspect of the invention.

In another aspect of the present invention there are provided fibers including a polyolefin thermoplastic resin; and greater than 10 weight percent and less than about 30 weight percent, based on fiber weight of aligned nanotubes. In a related aspect of the present invention there are provided fibers including a polyolefin thermoplastic resin; and aligned nanotubes, wherein the aligned nanotubes are characterized as having a distribution function FWHM of less than about 30 degrees. Many of the fibers according to these aspects of the present invention exhibit vastly higher thermal conductivities compared to isotropic polyolefin fibers.

DETAILED DESCRIPTION OF ILLUSTRATIVE EMBODIMENTS

Figure 1:
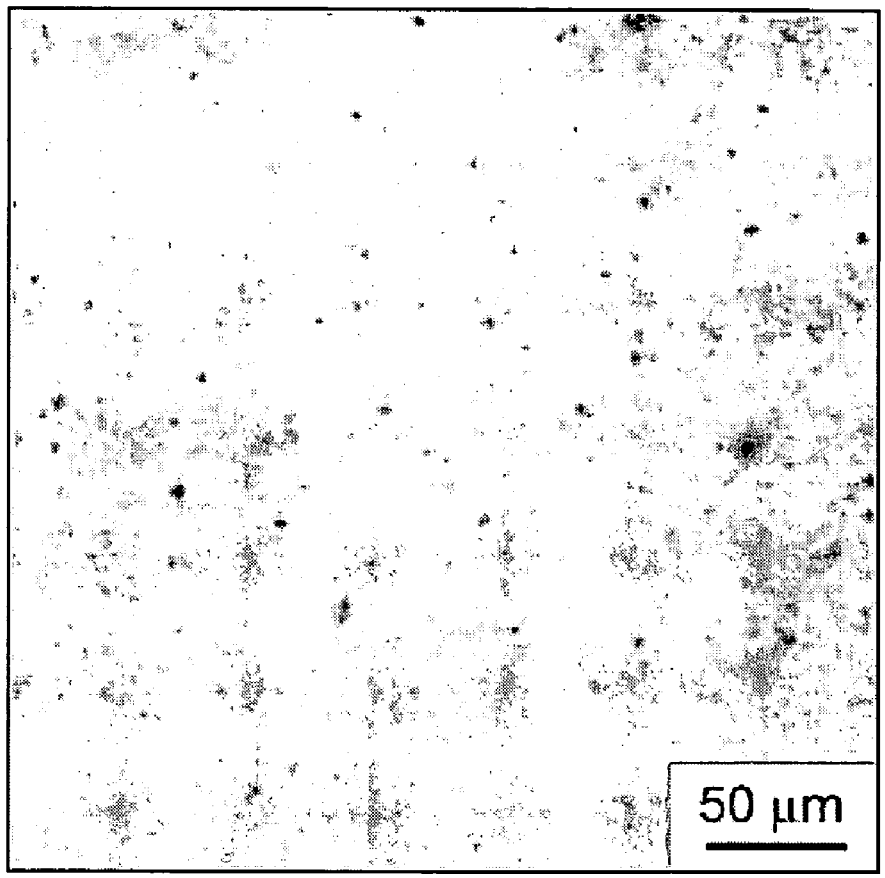
FIG. 1 shows an optical micrograph of 0.7 wt. % HiPco/PS composite thin film according to one embodiment of the present invention. The composite was prepared using a twin-screw compounder in which a dispersion of HiPco in DMF was added to a PS melt in the compounder.

The present invention may be understood more readily by reference to the following detailed description of the invention taken in connection with the accompanying figures and examples, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

In various embodiments of the present invention there are provided processes for providing nanotube composite materials composed of nanotubes and polymers. These processes typically include providing a dispersion of nanotubes in a suitable liquid, contacting the nanotube dispersion with a polymer melt, and mixing the nanotube dispersion with the polymer melt to form a nanotube composite melt. Subsequent processing (e.g., extruding, shaping, calendaring, drawing, fiber spinning, hardening, and cooling) of the nanotube composite polymer melt provides useful nanotube composite materials. Suitable processes are typically operated by contacting a nanotube dispersion with a polymer melt in which the temperature of the nanotube dispersion is cooler in temperature than that of the polymer melt. It is also envisaged that certain embodiments can be operated in which the temperature of the nanotube dispersion has a higher temperature than that of the polymer melt. Contacting of nanotube dispersions with polymer melts can be carried out using any one of a number of processes known in the polymer processing art, for example by dripping, pouring, flowing, coating, injecting, spraying, or any combination thereof, of the nanotube dispersion with the polymer melt. As used herein, the term "with the polymer melt" is meant not to restrict the order or position of the nanotube dispersion in relation to that of the polymer melt. For example, contacting includes a nanotube dispersion being transported into a polymer melt, a polymer melt being transported into a nanotube dispersion, as well as simultaneous transport of both a nanotube dispersion and a polymer melt to a contacting zone. In a preferred embodiment, the nanotube dispersion is contacted with a suitable polymer melt, such as by dripping liquid nanotube dispersion into a polymer melt that is undergoing shear, such as in a compounding device or mixer. In other embodiments, it is envisaged that the polymer melt may be added, such as by extrusion, into a suitable nanotube dispersion.

Suitable nanotube dispersions that are useful in the present invention include a plurality of nanotubes, typically carbon nanotubes, dispersed in a liquid. While dispersions of any type of nanotubes are useful according to the methods as provided herein, the nanotubes are typically carbon nanotubes, such as multi-walled carbon nanotubes ("MWNTs"). In a preferred embodiment of the present invention, the carbon nanotubes are single-walled carbon nanotubes (abbreviated herein as "SWNT"). SWNTs can be formed by a variety of conventional methods, some of which are described in U.S. Pat. No. 6,544,463, the disclosure of which is incorporated herein by reference in its entirety. SWNTs can be prepared by several well known methods, including the HiPco method, and are commercially available as well. Suitable SWNTs may be functionalized or unfunctionalized. SWNTs functionalized with alkane chains typically disperse well in organic solvents. Due to manufacturing conditions, SWNTs routinely have a residual metal content that varies in a range from about 1 wt % to about 50 wt %. These impurities can be reduced by various conventional purification methods if desired. It has been found that the purified SWNTs are best stored in some type of solvent, as opposed to being completely dried. If the purified SWNTs are completely dried before dispersion they often will irreversibly aggregate. If the solvent used to store the purified SWNTs is other than the first fluid, the solvent may be partially or substantially replaced by the first fluid. SWNTs possess a unique combination of strength, high modulus of elasticity, and excellent heat and electrical conductivity, but SWNTs are prone to aggregation ("bundling") due to Van der Waals attraction among the tubes.

Adequate dispersion is typically an important factor in composite performance, and discrete fillers are prone to aggregation. For example, SWNTs are fullerenes in the shape of a hollow tube, usually with a diameter of from about 0.7 to about 2 nm. Suitable nanotube dispersions are generally provided by dispersing a plurality of nanotubes in a liquid and providing energy to the nanotubes to break up relative large nanotube particles common in the solid phase, (e.g., powder particles, clumps, agglomerates, and combinations thereof, typically larger than about 100 microns in size), to relatively smaller, dispersed, particles in the liquid phase (e.g., individual nanotubes, nanotube bundles, nanotube ropes, nanotube aggregates, and combinations thereof, which are typically narrower than about 100 nanometers). Energy is typically provided to the nanotubes in a suitable liquid, such as by shearing and, preferably, by sonication. A variety of sonication techniques and sonication equipment is readily available in the art.

Generally, good dispersions of nanotubes in liquids disperse better in nanotube composite melts than do poor nanotube dispersions. Good dispersions of nanotubes typically have at least a portion of the plurality of nanotubes characterized as being agglomerates of nanotubes smaller than about 100 microns. Suitable nanotube dispersions are also characterized as being a homogenous fluid, for example, the nanotube dispersions being characterized as having substantially no particles visible to the unaided eye. Nanotube dispersions that are visibly clear to the eye are particularly useful in the present invention for ensuring good dispersion of nanotubes in nanotube composite melts. In this regard, the nanotube dispersions are preferably characterized as being homogenous fluid is characterized as having substantially no particles larger than about 100 microns. For example, well-dispersed single-walled carbon nanotubes are typically characterized as being a homogeneous grey fluid when viewing a 0.5 millimeter thick sample of said nanotube dispersion, wherein the concentration of a plurality of nanotubes relative to the nanotube dispersion is in the range of from about 0.1 mg/ml to about 0.4 mg/ml.

Suitable liquids for preparing nanotube dispersions may be organic or aqueous in nature. Suitable liquids may also include any combination of organic and aqueous liquids. Suitable aqueous liquids contain water and typically include a surfactant, a dispersant, or any combination thereof to aid the dispersal of the nanotubes. Further details of dispersing carbon nanotubes in aqueous liquids with surfactants are provided in PCT/US03/16086, "Carbon Nanotubes: High Solids Dispersions and Nematic Gels Thereof", filed 21 May 2003, the entirety of which is incorporated by reference herein. Accordingly, suitable nanotube dispersions prepared with surfactants may provide nearly any possible concentration of carbon nanotubes in the dispersion. A variety of surfactants and dispersants known to be effective for dispersing carbon black in aqueous and non-aqueous (i.e., organic-based solvent) dispersions can be generally applied to preparing the nanotube dispersions used in the present invention. Generally, the nanotube concentration using surfactants will be less than about 500 mg/ml, more typically less than about 200 mg/ml, even more typically less than about 100 mg/ml, even further typically less than about 50 mg/ml, and most typically less than about 25 mg/ml based on volume of the dispersion. Although very small concentrations of carbon nanotubes can be prepared in liquids, for example less than about 0.001 mg/ml, the nanotube concentration is typically at least about 0.001 mg/ml, more typically at least about 0.01 mg/ml, even more typically at least about 0.1 mg/ml, and even further typically at least about 0.5 mg/ml. Accordingly, the nanotube concentrations can be varied over a wide range for a variety of applications.

In certain embodiments, suitable nanotube dispersions prepared using organic liquids and substantially no surfactants have nanotube concentrations typically in the range of from about 0.001 mg/ml to about 2 mg/ml, more typically in the range of from about 0.01 mg/ml to about 1 mg/ml, and even more typically in the range of from about 0.1 mg/ml to about 0.5 mg/ml.

Suitable organic solvents used in the present invention have a wide range of thermal and physical properties. Preferably, suitable organic solvents have a normal boiling point temperature in the range of from about 100° C. to about 250° C. Typically, suitable organic solvents are capable of solubilizing, dispersing, or suspending individual carbon nanotubes, carbon nanotube bundles, carbon nanotube ropes, or any combination thereof. In this regard, suitable organic solvents typically include an alkane group, an aromatic group, a halogen atom, a nitrogen atom, a sulfur atom, an oxygen atom, or any combination thereof. In certain preferred embodiments, the organic solvent includes dimethyl formamide ("DMF"), toluene, xylene, trichlorobenzene, or any combination thereof. Although liquids that are compatible with the polymer melt are generally preferred in many embodiments of the process of the present invention, certain embodiments can utilize nanotube dispersions containing liquids that are incompatible with the polymer melt. As used herein, the term "compatible with the polymer melt" refers to compatibility of polymers and solvents with regard to polymer-solution thermodynamics. Compatible solvents include those that swell, soften, or are at least partially miscible with the polymer melt. Many combinations of polymers and solvents that are compatible (i.e., a solvent for the polymer) and incompatible (i.e., a non-solvent for the polymer) are provided in *Polymer Handbook*, 3rd Edition, Brandrup and Immergut, Eds., Wiley Interscience, New York, (1989), Chapter VII, "Solution Properties", the entirety of which is incorporated by reference herein.

Suitable polymer melts typically include any polymeric composition that is capable of deforming under the influence of a shear field. Suitable polymer melts typically have a finite viscosity and are capable of flowing under the influence of a shear stress, such as stirring, mixing, flowing, blending, compounding, kneading, molding, and the like. Suitable polymer melts may be composed of thermoplastic resins, thermoplastic elastomers, thermosetting resins, radiation curable resins, crosslinkable rubber precursors, oligomers, or any combination thereof. In certain embodiments, suitable polymer melts may contain one or more diluents, such as solvent, plasticizer, or oil, amounting to typically no more than about 50 wt %, more typically no more than about 40 wt %, even more typically no more than about 30 wt %, further typically no more than about 20 wt %, even further typically no more than about 10 wt %, particularly no more than about 5 wt %, more particularly no more than about 2 wt %, even more particularly no more than about 1 wt %, and even further particularly no more than about 0.2 wt % based on the weight of the polymer melt. Suitable polymer melt materials are capable of having almost any weight average molecular weight, and typically will have a weight average molecular weight in the range of from about 500 g/mol to about 10 million g/mol, more typically in the range of from about 2000 g/mol to 1 million g/mol, and even more typically in the range of from about 5000 g/mol to 500,000 g/mol. Suitable polymer melts may also include one or more additives known in the polymer processing art, such as flow aids, lubricants, impact modifiers, heat stabilizers, colorants, perfumes, and processing aids.

While any thermoplastic resin may be used in various embodiments of the present invention, suitable thermoplastic resins typically include at least one of, or any combination of two or more of the following: polyolefins, such as polyethylene, polypropylene, and ethylene α-olefin copolymers such as ethylene-propylene copolymer, polymethylpentene; halogenated polymers such as polyvinyl chloride, polyvinylidene chloride; polyvinyl acetate, ethylene vinyl acetate copolymers, polyvinyl alcohol, polyacetal; fluororesins such as polyvinylidene fluoride and polytetrafluoroethylene; polyesters such as polyethylene terephthalate, polybutylene terephthalate, and polyethylene naphthalate; styrenic polymers such as polystyrenes, polyacrylonitriles, styrene acrylonitrile copolymers, and ABS resins; polyphenylene ether (PPE) and modified PPE resin, aliphatic and aromatic polyamides, such as nylons, polyimides, polyamide imides; polymers and copolymers derived from units consisting of one or more $C_1$-$C_{20}$ n-alkyl acrylate and methacrylate monomers, such as polymethacrylic acid and polymethacrylates such as polymethyl methacrylate, polyacrylic acids; polycarbonates, polyphenylene sulfides, polysulfones, polyether sulfones, polyether nitriles, polyether ketones, polyketonse, liquid crystal polymers, silicone resins, ionomers, as well as blends, blocks, grafts, and alloys thereof.

Suitable thermoplastic elastomers include styrene-butadiene or styrene-isoprene block copolymers and hydrogenated polymers thereof, styrene thermoplastic elastomers, olefin thermoplastic elastomers, vinyl chloride thermoplastic elastomers, polyester thermoplastic elastomers, polyurethane thermoplastic elastomers, acrylic thermoplastic elastomers, polyamide thermoplastic elastomer, as well as any combination thereof.

Suitable thermosetting resin includes epoxy resins, polyimides, bis-maleimide resins, benzocyclobutenes, phenol resins, unsaturated polyesters, diallyl phthalates, silicone resins, polyurethanes, polyimide silicones, thermosetting polyphenylene ether resins, modified PPE resins, as well as any combination thereof.

Suitable crosslinkable rubber precursors and analogues thereof include precursors of the following: natural rubbers, butadiene rubbers, isoprene rubbers, styrene-butadiene copolymer rubbers, nitrile rubbers, hydrogenated nitrile rubbers, chloroprene rubbers, ethylene-propylene rubbers, chlorinated polyethylenes, chlorosulfonated polyethylenes, butyl rubbers, butyl rubber halides, fluorinated rubbes, urethane rubbers, and silicone rubbers.

Suitable radiation-curable resins include a combination of one or more of polymers, oligomers, and monomers that are ionizing radiation curable, such as acrylates and methacrylates, radical-polymerizable compounds, and materials having as a base an oligomer and/or monomer of a cation-polymerizable compounds and having blended therewith an additive for purpose of curing such as ultraviolet ray polymerization initiator, such as a photo acid generator ("PAG").

In the processes of the present invention, the contacting of the nanotube dispersion with the polymer melt is characterized as having a contact pressure and a contact temperature. The contact pressure is the pressure of the environment in the vicinity where the nanotube dispersion contacts the polymer melt. Typically, the contact pressure will be about the pressure of the ambient conditions in systems that are characteristically "open" to the environment. For example, the contact pressure in a process using a suitable polymer melt mixing device, such as a compounder, will be approximately atmospheric pressure where the contact point or contact zone is obtained by pouring or flowing nanotube dispersion from a location external to the polymer melt mixing device, through the ambient environment (e.g., atmospheric pressure air or inert gas), and into the polymer melt mixing device. In an other embodiment, the nanotube dispersion and polymer melt are contacted in a characteristically "closed" system to permit the contact pressure to vary from the pressure of the environment. In one embodiment, the contact pressure may be higher or substantially higher than ambient conditions, such as for injecting nanotube dispersion under moderate or high pressures. Operating the process in a closed system, or at high pressures, permits the use of low boiling liquids to prepare the nanotube dispersions, as discussed further herein. In alternate embodiments, the contacting may be done in a closed system for the purposes of carrying out the process to prevent the escape of vapors that could otherwise be harmful to the environment or to the process operators. Likewise, the contacting can be done in a closed system for maintaining the contact pressure lower than ambient, for example, for preventing the entrainment of gas in the nanotube composite melt.

During contacting, the liquid portion may heat up and possibly vaporize or boil if the temperature of the polymer melt is sufficiently high at the contact pressure to cause vaporization, boiling, or both, of the liquid. Boiling typically occurs when the vapor pressure of the liquid at the contact temperature is at, or exceeds, the contact pressure. In certain embodiments in which the contact pressure is atmospheric pressure, the vapor pressure of the liquid reaches atmospheric pressure when the contact temperature is about the normal boiling point of the liquid. Thus, in certain embodiments, the liquid is characterized as having a vapor pressure higher than about the contact pressure at the contact temperature. When boiling occurs during contacting, the process is typically carried out under conditions wherein the nanotube dispersion is added to the polymer melt at a slow enough rate, e.g., by dripping, to incorporate the nanotubes into the polymer melt. Too fast an addition typically reduces the degree of dispersion of the nanotubes in the polymer melt. Without being bound by any particular theory of operation, it is believed that sudden boiling, flashing, or both, of the solvent results in aggregation of the well-dispersed nanotubes on, or in, the polymer melt prior to incorporation of the dispersed nanotubes. Nanotube aggregates are typically quite difficult to redisperse once present in the polymer melt. In a preferred embodiment, accordingly, the temperature of the polymer melt is typically kept low enough to avoid boiling of the liquid during contacting. Accordingly, the boiling point temperature of the liquid is typically at least about 1° C., more typically at least about 3° C., even more typically at least about 10° C., and even further typically at least about 20° C. greater than the contact temperature. In certain embodiments it is desirable to remove the liquid from the polymer melt after the nanotubes are incorporated. Removal of the liquid can be typically achieved by heating to effect evaporation of the solvent. Removal of the solvent can also be effected by placing the nanotube composite melt under reduced pressure, such as in a vacuum. In this regard, in certain embodiments of the present invention the boiling point temperature of the liquid is no more than about 50° C. greater than said contact temperature.

For contact pressures of about atmospheric pressure, the polymer melt temperature is typically kept below the normal boiling point temperature of the liquid. Generally, the liquid is preferably characterized as having a vapor pressure lower than the contact pressure at the contact temperature. In certain embodiments, the contact pressure is about atmospheric pressure. In other embodiments, the contact temperature is about the temperature of the polymer melt.

Mixing of the nanotube dispersions with the polymer melt is typically carried out using any of a number of polymer melt and liquid combining methods, such as compounding, kneading, blending, stirring, dispersing, shearing, or any combination thereof. In certain embodiments, mixing is typically carried out under conditions sufficient to distribute the nanotubes and at least a portion of the liquid in the polymer melt.

Certain embodiments of the present invention further include removing liquid from the nanotube composite melt. In these embodiments, the nanotubes are typically incorporated into the polymer melt prior to the liquid being essentially completely vaporized. The liquid can be removed by heating a portion of the nanotube composite melt, for example in the vicinity of a vapor port on a suitably designed plastic processing device, such as in an extruder. The process of the present invention may also include increasing the temperature of the nanotube composite melt to effect removal of the liquid. Removal of the liquid can be readily carried out by increasing the temperature of the nanotube composite melt to a temperature greater than the boiling point temperature of the liquid.

Certain embodiments of the present invention further include one or more additional plastics processing steps such as extruding the nanotube composite melt to form a nanotube composite extrudate. Examples of nanotube composite extrudates may take the form of films, sheets, fibers, tubes, profiles, rods, or any combination thereof. For example, melt spinning of the nanotube composite melt can be done in certain embodiments to form nanotube composite fibers.

The present invention also provides fibers that are composed of a polyolefin thermoplastic resin, and greater than 10 weight percent and less than about 30 weight percent, based on fiber weight, of aligned nanotubes. Suitable polyolefins are described above herein, and typically include any of the commodity grades or specialty grades of polyolefins that are commercially available. The fibers of the present invention are typically prepared by fiber spinning nanotube composite melts made according to the processes of the present invention. In various embodiments, the aligned nanotubes are characterized as having a distribution function FWHM of typically less than about 30 degrees, more typically less than about 20 degrees, and even more typically less than about 10 degrees. Suitable methods for measuring the distribution function FWHM are provided herein below. The fibers of the present invention are characterized as having a thermal conductivity typically greater than about 1 watts per meter per degree Kelvin ("$Wm^{-1}K^{-1}$"), more typically greater than about 2 $Wm^{-1}K^{-1}$, even more typically greater than about 5 $Wm^{-1}K^{-1}$, and further typically greater than about 10 $Wm^{-1}K^{-1}$. Typically, the higher the concentration of nanotubes in the fibers, the greater the thermal conductivity. In certain embodiments of the present invention, polyethylene fibers containing about 30 weight percent of SWNT nanotubes will have thermal conductivities up to about 50 $Wm^{-1}K^{-1}$.

In other related embodiments of the present invention there are provided fibers that are composed of a polyolefin thermoplastic resin and aligned nanotubes. In these embodiments, the aligned nanotubes are characterized as having a distribution function FWHM of typically less than about 30 degrees, more typically less than about 20 degrees, and even more typically less than about 10 degrees. These fibers typically have elevated thermal conductivities compared to the polyolefin fibers absent the nanotubes. The fibers of the present invention are characterized as having a thermal conductivity typically greater than about 1 watts per meter per degree Kelvin ("$Wm^{-1}K^{-1}$"), more typically greater than about 2 $Wm^{-1}K^{-1}$, even more typically greater than about 5 $Wm^{-1}K^{-1}$, and further typically greater than about 10 $Wm^{-1}K^{-1}$. Typically, the higher the concentration of nanotubes in the fibers, the greater the thermal conductivity. In certain embodiments of the present invention, polyethylene fibers containing about 30 weight percent of SWNT nanotubes will have thermal conductivities up to about 50 $Wm^{-1}K^{-1}$.

EXAMPLES

SWNT nanotube polymer composites of both amorphous and semicrystalline matrix polymers were prepared. A twin-screw compounder was used for the fabrication of the composites, which enabled direct mixing of the SWNT with molten polymers, which provided a good distribution of the SWNT dispersed in the polymer. Melt spinning of composite fibers produced extraordinary alignment of the SWNTs as determined by polarized Raman spectroscopy. The mechanical properties (tensile modulus) of the fibers were also measured and compared to theoretical values.

Experimental Procedure

Matrix polymers for preparing polymer melts included polystyrene (PS, MW: ~250,000 g/mol, supplied by Scientific Polymer Products) and polyethylene (PE, high density, supplied by Aldrich). Single walled carbon nanotubes (SWNT) for the PS composites were synthesized by the high-pressure carbon monoxide method (HiPco) and used unpurified. (Rice University: Nikolaev, P., et al., Chem. Phys. Lett. (1999), 313, 91) The SWNTs for the PE composites were synthesized by the laser ablation method (Tubes@Rice) and were received purified, suspended in toluene.

The SWNTs were mixed with the polymer melts using a twin screw MicroCompounder from DACA Instruments with a barrel capacity of 5 $cm^3$. HiPco nanotubes, 0.05 wt %, were sonicated in dimethylformamide (DMF, normal boiling point about 153° C.) for 3 hours to form a nanotube dispersion. The compounder was filled to two-thirds of capacity with PS polymer melt at 145° C. and the HiPco/DMF dispersion was added drop-wise until the compounder was full. The temperature was subsequently increased to 155° C. to evaporate the DMF after which the temperature was lowered to 145° C. and more HiPco/DMF dispersion was added. This process was repeated until 0.7 wt % loading of SWNT in PS was attained.

Tubes@Rice were sonicated in a 0.3 wt % toluene dispersion for 1 h to form a nanotube dispersion. The Tubes@Rice dispersion was subsequently added dropwise to the compounder at 145° C., which was filled to two-thirds of capacity with PE polymer melt. The toluene boiled instantly leaving the Tubes@Rice in the PE polymer melt. After evaporating the toluene, additional Tubes@Rice/toluene dispersion was added. Tubes@Rice/PE composites of 1, 5, 10, and 20 wt % nanotube loading were obtained.

Transmission light microscopy was used to evaluate the distribution of SWNT within the composites. HiPco/PS films for light microscopy were pressed at 150° C. to a thickness of ~150 µm. At this thickness the films appeared dark brown in transmission. The semicrystalline structure of the Tubes@Rice/PE composites produced an opaque sample that prevented transmission light microscopy.

Composite fibers were melt-spun using a DACA SpinLine consisting of a single spinneret hole (diameter 500 µm, length ~1.7 mm) attached to a heated barrel with a piston extruder. The extruded fiber was air-cooled and drawn under tension using a variable-speed winder. Pristine PE, 1, and 5 wt % Tubes@Rice/PE composites were spun at 150-160° C. and a windup speed as high as 50 m/min. Composites with 10 and 20 wt % Tubes@Rice were spun at 175-180° C.; the maximum windup speed for the 10 wt % composite was 5 m/min. The 20 wt % composite could be partially wound up. The HiPco/PS composite could be spun at 155° C. with windup speeds up to 60 m/min.

SEM images for composite fiber characterization were obtained with a JEOL 6300FV SEM at 2 kV. Samples were Pt/Au coated.

Orientation of SWNTs within the composite fibers was assessed using a Renishaw micro-Raman spectrometer in VV polarization geometry (1-µm beam spot) and 514.5-nm excitation. To minimize experimental errors, five positions along the fiber were measured at θ=0 and 90°, where θ is the angle between the fiber axis and the polarization vector. Polarized Raman spectra were recorded for selected fiber diameters on 1, 5, 10, and 20 wt % Tubes@Rice/PE composite fibers. In VV geometry, the Raman intensity of a single SWNT is proportional to $\cos^4\theta$. For fibers, $\cos^4\theta$ weighed by an orientation distribution function of the SWNTs is integrated to obtain the relative Raman intensity at different fiber angles (Haggenmueller, R., et al., Chem. Phys. Lett. (2000), 330, 219; Hwang, J. et al., Phys. Rev. B (2000), 62, R13 310). A 2D model describing the orientation distribution is to consider a constant for the unaligned fraction, representing nanotube agglomerates without a preferred orientation, and to use a Lorentzian or Gaussian function to describe the aligned part. A 3D model with a cylindrical Lorentzian function resulted in a slightly different FWHM. The results are reported using the 2D model, because these are adequate for comparing the alignment in different fibers. For the Tubes@Rice/PE composite fibers, a Lorentzian function alone worked well due to the good alignment of the SWNT. The constant for the unaligned fraction was neglected, because the tail of the Lorentzian function at θ=90° accounted well for the nonzero Raman response. The Raman intensity ratio ($I_0°/I_{90}°$) was used to determine the FWHM of the distribution function, which is a good measure of the alignment of the SWNT in the composite fibers. An error of ±5% was estimated for the FWHM due to the roughness of the fiber surface and the focus uncertainty. Raman spectroscopy is surface sensitive since the penetration depth is generally no more than several microns depending on the SWNT loading. Although it is possible that the alignment inside the fiber could be different from that on the fiber surface, without being bound by a particular theory of operation, it is believed that the Raman ratio measured on the fiber surface provides a reasonable representation of the overall nanotube alignment throughout the fiber.

Mechanical properties of pristine PE fibers, 5, 10 and 20 wt % Tubes@Rice/PE composite fibers were obtained from tensile tests using an Instron 4206 (10 N-load cell). The gauge length was 1 cm. The fibers were fixed on paper frames and tested at room temperature with a deformation rate of 1 mm/min.

The crystallinity of the PE in Tubes@Rice/PE composite fibers and pristine PE fibers was obtained using DSC measurements performed with a Perkin-Elmer differential scanning calorimeter using a heating rate of 10°/min.

Results and Discussion

The SWNT/PS composite with 0.7 wt % HiPco from DMF dispersion was homogenous, having a good distribution of SWNTs on a 10-μm scale (FIG. 1). A few particles were detected which are believed to originate from SWNT agglomerates in the DMF dispersion. DMF has a boiling point slightly higher than the process temperature of PS at ~145-150° C. Thus the SWNT/DMF dispersion was added below the boiling point of the solvent where the DMF swelled the PS and incorporated the nanotubes.

Toluene (normal boiling point temperature of about 110° C.) is a good dispersant for Tubes@Rice SWNT. Toluene is able to soften PE polymer melts at 145° C. Contacting the toluene/SWNT nanotube dispersion with the hot PE polymer melt resulted in boiling and quick evaporation of the toluene. During process development studies, it was found that adding nanotube dispersions slowly resulted in better incorporation of the nanotubes in the PE polymer melt. Thus, a careful balance between adding the toluene dispersion and the evaporation rate is necessary to prevent intense boiling that causes nanotube agglomeration.

Using a compounder for contacting the nanotube dispersions with the polymer melts is efficient in preparing modest quantities of SWNT/polymer composites and could be modified into a continuous process for a larger-scale fabrication. The processes of the present invention are applicable to a wide range of polymer melts, especially thermoplastics and selected thermosets.

Figure 2:
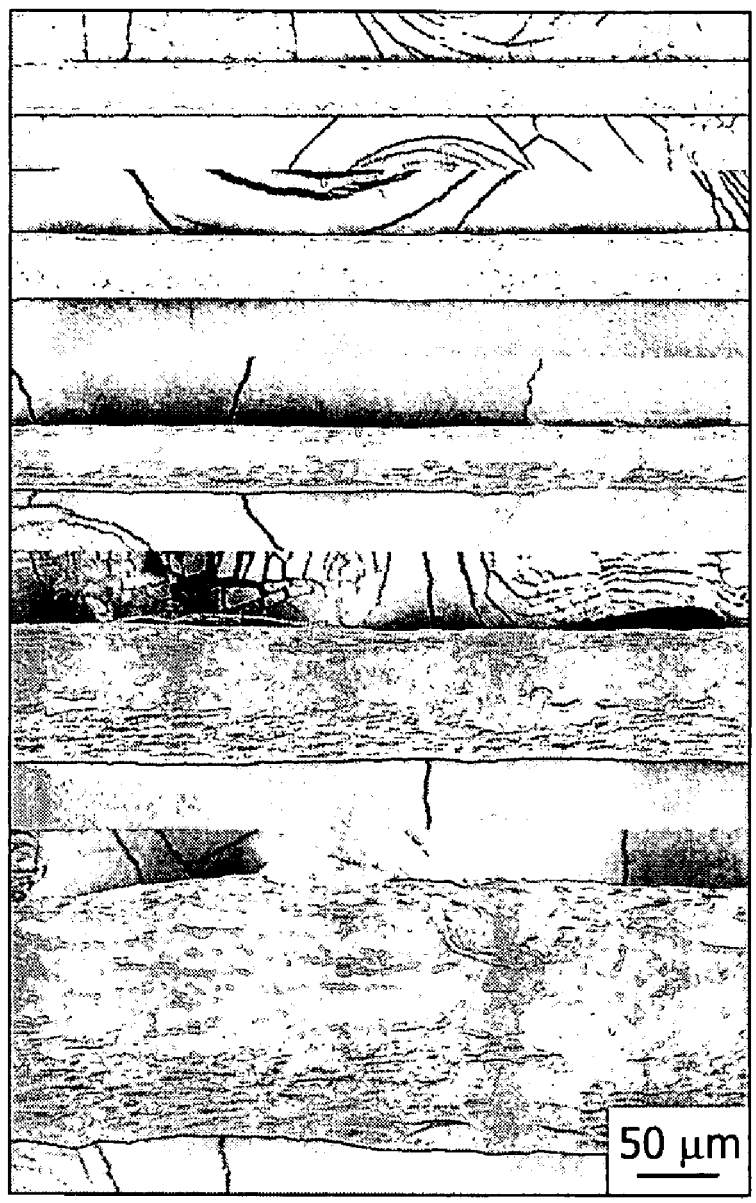
FIG. 2 shows scanning electron micrographs (SEM) of Tubes@Rice/PE composite fibers. From top: 0, 1, 5, 10 and 20 wt. % Tubes@Rice composite fibers. Tubes@Rice were suspended in toluene prior to melt mixing.

Fibers were successfully spun from the HiPco/PS composite and from the Tubes@Rice/PE composites. Pristine PE and Tubes@Rice/PE composites having SWNT concentrations of up to 10 wt % were spun and wound up continuously. A 20 wt % Tubes@Rice/PE composite broke and could not be wound up. As the weight fraction of the SWNTs in the fibers increased, the smallest attainable fiber diameter also tended to increase, for example, 50 μm for 5 wt % Tubes@Rice and 100 μm for 20 wt %. The surface roughness and striations also increased with the addition of SWNT, a typical sign of increased melt viscosity (FIG. 2). Additional steps could be taken to improve the surface quality, such as lubricating the spinneret. The 10 and 20 wt % nanocomposite fibers exhibited non-uniform diameters along the fiber axis.

Figure 3:
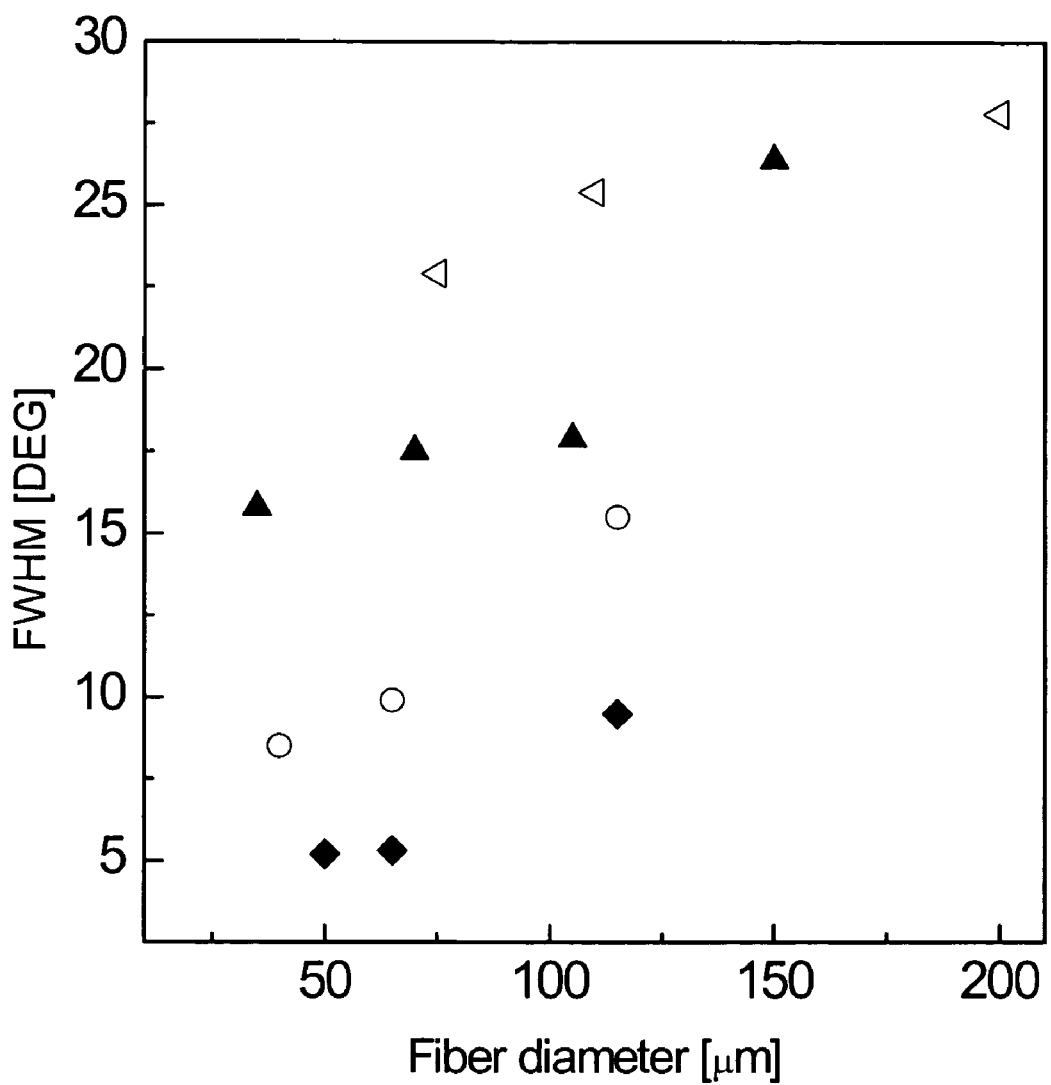
FIG. 3: shows the FWHM of the distribution function fitted to the Raman ratio $I_{90}°/I_0°$ obtained from polarized Raman spectroscopy on Tubes@Rice/PE composite fibers with 1 wt % (♦), 5 wt % (○), 10 wt % (▲), and 20 wt % (◁) nanotube loading as a function of fiber diameter.

The polarized Raman spectroscopy indicated an extraordinarily good alignment with a FWHM of the orientation function of ~5° for the 1 wt % composite fibers with diameters of ~50 and 65 μm (FIG. 3). For a 75 μm 20 wt % composite fiber a FWHM of ~23' was obtained. The alignment of the SWNT in the composite fibers demonstrated two clear trends: the FWHM decreased with both decreasing fiber diameter and decreasing SWNT loading. Without being bound by a particular theory of operation, it is believed that fibers having smaller diameters experience greater extensional flow, which produce better alignment. The SWNTs in composites with lower loading may have more freedom to flow during shear, which results in better SWNT alignment. The SWNTs in composites with higher loading may be restricted in motion by neighboring nanotubes and cannot align as well. Furthermore, the SWNTs could tend to agglomerate at higher loadings, which prevents good alignment. Overall, the high extensions achievable in melt fiber spinning produce highly aligned SWNT over a wide range of composite loading.

Figure 4:
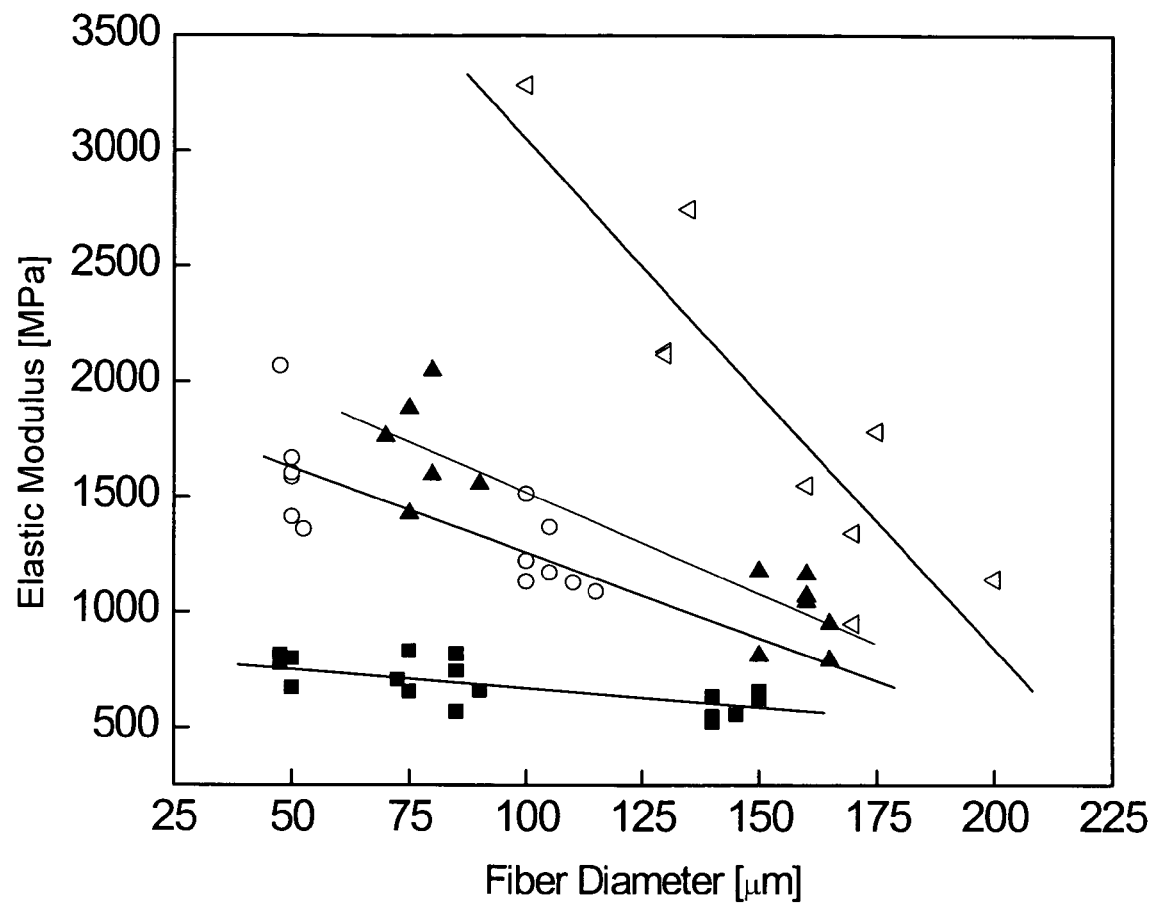
FIG. 4 shows elastic modulus vs. diameter for Tubes@Rice/PE composite fibers with 0 wt % (■), 5 wt % (○), 10 wt % (▲), and 20 wt % (◁) nanotubes. A linear fit is provided for each SWNT concentration data set.

The mechanical properties of the PE and Tubes@Rice/PE composite fibers were measured as a function of fiber diameter and SWNT weight fraction (FIG. 4). Linear fits to the data points are shown for each SWNT concentration. Both better SWNT alignment in fibers with small diameter and higher nanotube loading substantially increased the elastic modulus. The modulus increased with SWNT content, for example, ~625, ~800, ~1000, and ~1750 MPa for 0, 5, 10, and 20 wt % Tubes@Rice for a diameter of 160 μm (FIG. 4). At a diameter of 100 μm, the moduli were ~650, ~1250, ~1750, and ~3050 MPa for 0, 5, 10, and 20 wt % Tubes@Rice. This is an enhancement of more than 450% for the 20 wt % composite relative to the PE fiber containing no nanotubes.

DSC showed that the crystallinity of the PE in the composite fibers was ~70% independent of the loading (5-20 wt %) and the fiber diameter (50-200 μm). Thus, variations in the PE crystallinity could be excluded as a reason for the increased moduli in smaller-diameter fibers.

Figure 5:
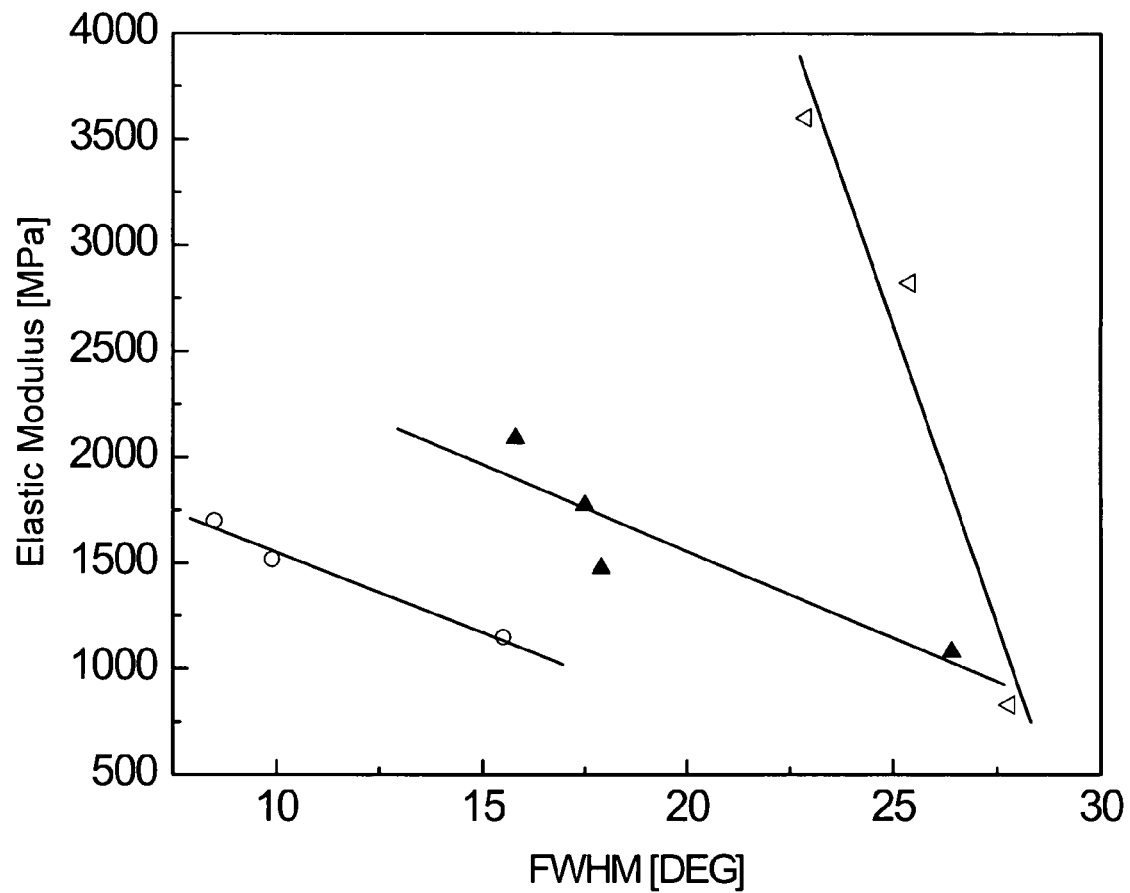
FIG. 5 shows elastic modulus vs. FWHM for Tubes@Rice/PE composite fibers with 5 wt % (○), 10 wt % (▲), and 20 wt % (◁) nanotubes. A linear fit is provided for each SWNT concentration data set.

The effects of alignment and concentration of the SWNTs on the mechanical properties of composite fibers are summarized in FIG. 5, which is a combination of the data depicted in FIGS. 3 and 4. The elastic moduli were taken from the linear fits in FIG. 4 at diameters and SWNT loadings corresponding to the 10 fibers characterized in FIG. 3. At a fixed FWHM, the modulus increased with SWNT concentration, for example, ~1200 to ~2000 MPa for 5 and 10 wt % with a FWHM of 15 (FIG. 5). Furthermore, the modulus increased with better alignment for a given composite composition, for example, from ~800 to 3600 MPa for the 20 wt % composite. The elastic modulus is apparently more sensitive to alignment for higher concentration nanotube composites. Thus, alignment and SWNT concentration both contribute to improving the mechanical properties of the composite fibers.

Figure 6:
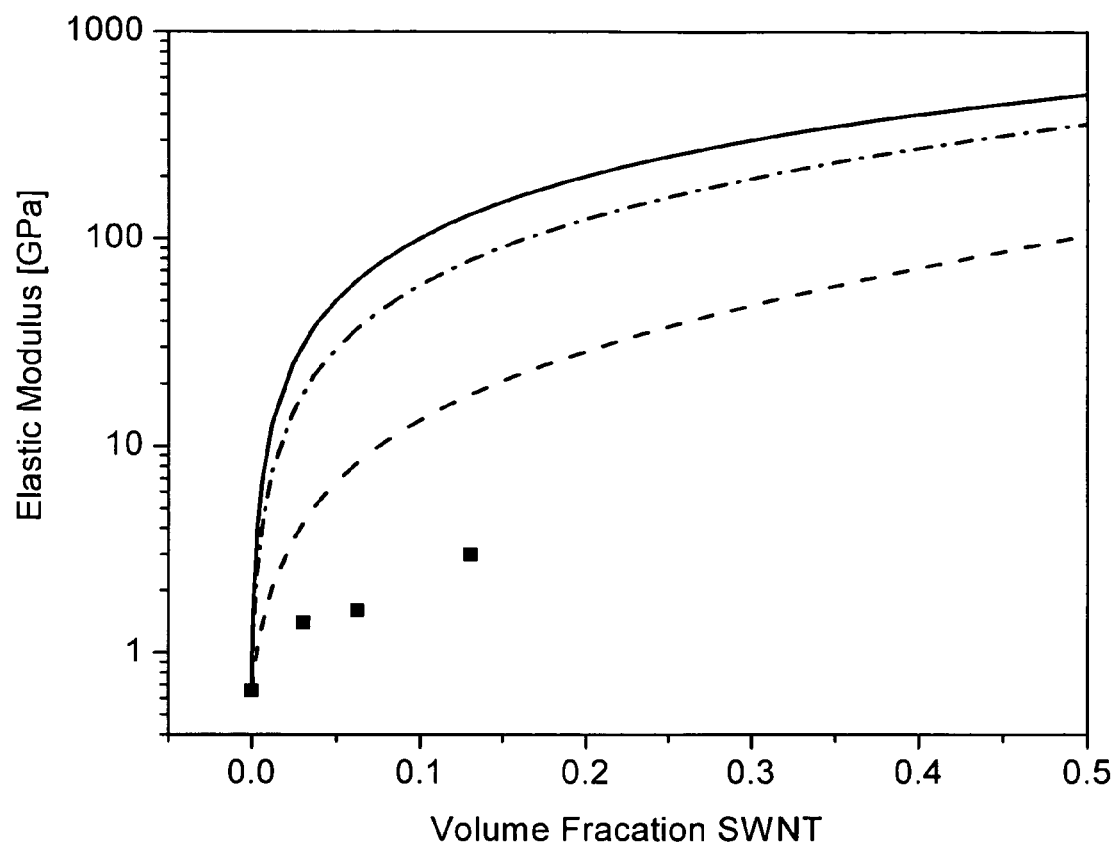
FIG. 6 shows calculated and experimental data for elastic modulus of SWNT/PE composite fibers as a function of SWNT loading. Continuous SWNTs (—), SWNTs having an aspect ratio of 1000 (-•-), SWNTs having an aspect of ratio 100 (---), and experimental data from Tubes@Rice/PE composite fibers with a diameter of 100 μm (■).

The Tubes@Rice/PE composite fibers have demonstrated very promising mechanical properties. A theoretical limit of these materials can be calculated with models for the longitudinal elastic modulus of composite fibers. The rule of mixtures is a first approach:

$$E=E_f V_f + E_m V_m$$

where $E_f$ and $E_m$ are the elastic moduli of the reinforcing filler and of the matrix, respectively, and $V_f$ and $V_m$ are the volume fractions. This model predicts realistic moduli for continuous fiber composites where the load is carried directly by the fibers. Here, it gives the upper limit for the modulus of a discontinuous-SWNT composite (FIG. 6). Moduli were calculated for SWNT volume fractions up to 0.5, using a density of 1.6 g/cm$^3$ for SWNT and 0.96 g/cm$^3$ for PE. Elastic moduli of 1000 GPa for the SWNT and 0.65 GPa for the PE matrix were assumed.

One model for SWNT composites includes the aspect ratio $l_f/d_f$ of the filler, where $l_f$ is the length and $d_f$ the diameter of the nanotubes. The following equations are derived from the Halpin-Tsai equations (Halpin, J. C., et al., Polymer Eng. Sci. (1976), 16, 344., with the assumptions of a circular cross-section, uniform fiber distribution, and void free matrix (Mallick, P. K., *Fiber-reinforced composites*, Marcel Dekker, Inc. (1993)):

$$E = \frac{1 + 2(l_f/d_f)\eta V_f}{1 - \eta V_f} E_m$$

$$\eta = \frac{(E_f/E_m) - 1}{(E_f/E_m) + 2(l_f/d_f)}$$

where the factor $\eta$ also depends on $E_f$ and $E_m$. The modulus was calculated for composites with SWNT aspect ratios of 1000 and 100. The calculated moduli for the realistic aspect ratio of 1000 is within 30% to the curve of the continuous model showing the potential of SWNT composites.

For comparison, the experimental data from the Tubes@Rice/PE composite fibers with a diameter of 100 µm are plotted in FIG. 6. The experimental data lies below the calculated values. Without being bound by a particular theory of operation, the reasons for this large difference can be discussed by inspecting the assumptions for the model: (a) perfect bonding of the nanotubes to the matrix, (b) complete dispersion of the nanotubes, and (c) perfect alignment of the nanotubes. The Raman data show that the nanotubes are highly aligned so that the nanotubes interact with the load in their strong longitudinal axis, which is consistent with the mechanical model. Further improvements to the already quite good alignment are possible, but are not likely to result in order-of-magnitude improvements in properties. On the other hand, nanotube waviness can influence the mechanical performance of the composites and result in a modulus reduction (Fisher, F. T., et al., Appl. Phys. Lett. (2002), 80, 4647). The nanotubes are well distributed in the composites but it is not clear if they are dispersed on the nanoscale. SWNT ropes typically have a decreasing modulus with increasing rope diameter (Salvetat, J. P., et al., Phys. Rev. Lett. (1999), 82, 944). Thus, it appears that a complete dispersion of the nanotubes is otherwise needed to obtain the properties predicted by this theory. The interface that transfers the load from the matrix into the nanotubes has not been specifically modified in the present work, so we can expect substantially better properties by optimizing the SWNT/matrix interface, such as by nanotube surface modification, or by incorporating functionalized nanotubes, surfactants, dispersing agents, or any combination thereof.

CONCLUSIONS DRAWN FROM THE ABOVE EXAMPLES

We have demonstrated the successful fabrication of nanocomposite fibers consisting of a PS or PE matrix with up to 20 wt % SWNT; additional enhancements and modifications, such as by the use of lubricants, should provide fibers containing up to 30 wt % SWNTs. The fabrication method using a twin-screw compounder is efficient and promotes nanotube distribution. Furthermore, this method is applicable to a wide range of matrix polymers. Melt fiber spinning resulted in highly aligned nanotubes with a distribution function FWHM as small as 50, and the alignment typically decreases for higher nanotube loading. High loading and good alignment of SWNT in PE resulted in enhanced mechanical properties. Composite models predict promising mechanical properties for nanocomposites with discrete SWNTs in a polymer matrix. We have demonstrated that good alignment giving rise to highly thermally conductive fibers (see examples, below) can be achieved by melt fiber spinning.

Additional examples of the present invention are listed in the following tables. Each table is followed by a discussion of the results of that table.

TABLE 1

PMMA + tubes@rice and soot - Comparative Examples

| Sample ID | SWNT concentration | Processing method |
|---|---|---|
| PMso1 | 1 wt % | 3 g PMMA were added to the compounder at 150° C. and 100 rpm. Then 30 mg dry soot (pristine SWNT) were added to the compounder and mixed for 20 min. |
| PMpRi01 | 1 wt % | 3.5 g PMMA powder were placed in 2 ml toluene and sonicated for 20 min, forming a "slurry". Then, 35 mg tubes@rice in 5.7 ml toluene were added. Following, the composite was cast into a teflon dish and dried. Then, the composite was compounded in the compounder at 160° C., 100 rpm for 40 min. |
| PMpRi02 | 1 wt % | 35 mg tubes@rice were placed in 25.7 ml toluene and sonicated for 4.5 hrs. Then, 3.5 g PMMA powder were added and the mixture was sonicated for 1 hr. The mixture was cast into a teflon dish and dried. Then, the composite was compounded at 105-145° C., 100 rpm for 30 min. |
| PMpe1Ri03 | ~0.15 wt % | 6 mg tubes@rice were placed in 10 ml toluene and sonicated for 5 hrs. 1.2 g PMMA were circulated in the compounder at 150° C., 100 rpm. Then ~5 ml of the toluene/nanotube dispersion were injected into the compounder. Immediately, 1 g PMMA was added and the composite was compounded for 30 min. |

Table 1 Results. PMso1 had a very poor nanotube dispersion with big soot particles and areas of pure PMMA (as seen by light microscopy). The nanotubes could not be disentangled by the shear forces in the compounder. PMpRi01 had a nanotube dispersion similar to PMso1; the nanotubes were not dispersed in the slurry prior to the compounder processing. The dispersion in the PMpRi02 is better as compared to PMso1 and PMpRi01; the nanotube particles are smaller and there are areas with good nanotube dispersion (observed in the light microscope). The sonication of the nanotubes in toluene was likely to break some agglomerates. PMpelRi03 resulted in poor dispersion, comparable to PMpRi02. Apparently, too much of the nanotube/toluene dispersion was injected too quickly into the hot polymer melt, so that there was no time for the toluene/nanotube mix to enter the PMMA melt.

TABLE 2

PE + tubes@rice toluene in compounder

| Sample ID | SWNT concentration | Processing method |
|---|---|---|
| PERi01 | 0.9 wt % | 30 mg tubes@rice in 5 ml toluene were injected into the empty compounder at 100° C. The temperature was then increased to 150° C. The toluene boiled and evaporated to some part to make room for the PE (barrel volume is ~5 ml). 3.5 g PE were added at 150° C. and 100 rpm. Mixed for 5 min at 170° C. Mixed for ~25 min more at 145-128° C. Extruded at 145° C. |
| PERi02 | 2 wt % | 80 mg tubes@rice were placed in 30 ml toluene and sonicated for 3 hrs. 4 g PE were circulated in the compounder at 150° C., 100 rpm (compounder is full). Then at 135° C., 5 ml toluene/nanotube dispersion were slowly added to the compounder. After ~5 min mixing more toluene/nanotube dispersion was added. This was repeated until all the prepared nanotube/toluene dispersions was added. Extruded at 145° C. and dried. |
| PERi03 | 5 wt % | 190 mg tubes@rice were placed in 60 toluene and sonicated for 1 hr. 2.5 g PE were added to the compounder at 140° C. The toluene/nanotube dispersion was added stepwise (like PERi02) at 135-140° C. More PE was added to fill up the compounder (1.3 g for a total of 3.8 g PE). Extruded at 145° C. and dried. |
| PERi04 | 10 wt % | 235 mg tubes@rice were placed in 50 ml toluene and sonicated for 1 hr. 1.6 g PERi03 was added to compounder at 145° C. The toluene/nanotube dispersion was added stepwise (like PERi02). After all of the nanotube/toluene dispersion was added 1.7 g of PERi03 and 0.69 g PE were added. Extruded at 145° C. and dried. |
| PERi05 | 20 wt % | 419.4 mg tubes@rice were placed in 70 ml toluene and sonicated for 1 hr. 1 g PERi04 was added to the compounder at 145° C. and 150 rpm. 70 ml of toluene/nanotube dispersion was added stepwise (like PERi02) to the compounder. Then at 155° C., 2.6 g PERi04 and 300 mg PE were added, compounded for 5 min at 200 rpm and extruded at 145° C. Extruded at 145° C. and dried. |
| PERi04' | 10 wt % | 1.4 g PERi05 were added to compounder and mixed with 500 mg PERi04 and 1.4 g PE at 150° C. and 200 rpm for 10 min. 1.75 g were extruded and the remaining material was used for PERi03'. |
| PERi03' | 5 wt % | 1.445 g PE and 500 mg PERi03 were added to the remaining PERi04' in the compounder. The composite was mixed at 150° C. and 200 rpm for 10 min. The composite was extruded at 145° C. |

Table 2 Results. The general characterization (mechanical properties, crystallinity, nanotube alignment) of the composites PERi02, PERi03', PERi04', and PERi05 are described in the first examples section, above. The thermal conductivities of PERi02, PERi03', PERi04', and PERi05 were measured using the comparative method. PERi05 had a thermal conductivity of about 12 $Wm^{-1}K^{-1}$. This more than a 20× increase compared to pristine PE. PERi04' had a thermal conductivity of about 2 $Wm^{-1}K^{-1}$. These results indicate that it is better to place the polymer melt in the compounder before the nanotube/toluene solutions is added (cf. sample PERi01). The nanotube/toluene dispersion should be added drop wise so that the dispersion can mix with the PE before all the toluene is evaporated. In order to gain more time for the incorporation of the nanotube dispersion into the PE melt, a solvent with a higher boiling point like DMF (boiling point of 153° C.) can be used. The nanotube/DMF dispersion did not boil at 145° C. and could mix with the PE matrix prior to completely evaporating.

TABLE 3

Dispersion study with compounder

| Sample ID | SWNT concentration | Processing method |
|---|---|---|
| PS-5Hip79 | 5 wt % | 2 g PS were pressed to a film in the hot press at 160° C. 100 mg HiPco79 were sandwiched in between two halves of the PS film and pressed at 160° C. in the hot press. This was repeated for 100 mg HiPco79 and 2 g PS. These composites were then melt compounded at 135-155° C. for 90 min. |
| PSTol-Hip79 | <1 wt % | 250 mg HiPco 79 were placed in 250 ml toluene and sonicated for 8 hrs. 2 g PS were added to the compounder at 155° C. Then the toluene/nanotube suspension was added drop wise to the compounder (unknown how much exactly was added) and 3 g PS were added. The composite was compounded for 5 hrs. at 150° C. and 200 rpm. |
| PS-Hip79-triton-X | <1 wt % | 50 mg HiPco 79 were placed in 250 $H_2O$ with 0.25 ml of the surfactant Triton-X and sonicated for 6 hrs. Some PS was placed in the compounder and the $H_2O$/nanotube suspension was added drop wise at 150° C. (unknown how much exactly was added). |
| PS-DMF-Hip79 | 1 wt % | 50 mg HiPco 79 was placed in 100 ml DMF and sonicated for 3 hrs. 3 g PS were placed in compounder and the nanotube/DMF solution was added drop wise at 145° C. until the compounder was full. The temperature was then increased to 150° C. to evaporate the DMF after which the temperature was decreased to 145° C. to add more nanotube/DMF solution. This was repeated until all of the nanotube/DMF suspension was added to the compounder. Finally, 2 g PS were added. |
| Freeze dry NT | 0.1 wt % | 3 g PS were added to the compounder at 180° C. and 100 rpm. Then 5 mg freeze dried SWNT were added, followed by additional 2 g PS. The composite was compounded for 1 hr 45 min and extruded. |
|  | 0.1 wt % | 3 g PS were added to the compounder at 180° C. and 100 rpm. Then 5 mg HiPco 87 were added, followed by additional 2 g PS. The composite was compounded for 1 hr 45 min and extruded. |

Table 3 Results. This dispersion study was conducted to compare the dispersion of the nanotubes in the PS matrix after different fabrication methods. PS was chosen for its transparency. The dispersion was studied by light microscopy. The "PS-DMF-Hip79" composite is described in the examples in the first section, above. The dispersion quality of PS-DMF-Hip79 was better than all the other PS composites of this dispersion study. SWNTs dispersed better in DMF than they did in toluene or in water with surfactant Triton-X, resulting in a better dispersion in DMF prior to the composite fabrication. This superior dispersion is transferred to the composite. The toluene/nanotube suspension apparently evaporated too quickly at the process temperature which resulted in nanotube agglomerates. The water with surfactant stabilized nanotubes boiled violently at the process temperature, resulting immediately in nanotube agglomerations. Adding SWNT dry to the PS matrix resulted in a very poor dispersion. The shear forces during the compounding apparently were not strong enough to disperse nanotube agglomerates.

While the invention has been described with reference to preferred and example embodiments, it will be understood by those skilled in the art that a variety of modifications, additions and deletions are within the scope of the invention, as defined by the following claims.

What is claimed is:

1. A process, comprising:
    providing a nanotube dispersion comprising a plurality of nanotubes and a liquid;
    contacting said nanotube dispersion with a polymer melt;
    mixing said nanotube dispersion with said polymer melt to provide a nanotube composite melt; and
    removing vaporized liquid from said nanotube composite melt.

2. The process according to claim 1, wherein said contacting is characterized as having a contact pressure and a contact temperature, and said liquid is characterized as having a vapor pressure higher than said contact pressure at said contact temperature.

3. The process according to claim 2, further comprising removing vaporized liquid from said nanotube composite melt.

4. The process according to claim 1, wherein said contacting is characterized as having a contact pressure and a contact temperature, and said liquid is characterized as having a vapor pressure lower than said contact pressure at said contact temperature.

5. The process of claim 4, wherein said nanotube dispersion comprises SWNTs.

6. The process of claim 4, wherein the concentration of said plurality of nanotubes relative to said nanotube dispersion is in the range of from about 0.001 mg/ml to about 2 mg/ml.

7. The process of claim 4, wherein the concentration of said plurality of nanotubes relative to said nanotube dispersion is in the range of from about 0.01 mg/ml to about 1 mg/ml.

8. The process of claim 4, wherein the concentration of said plurality of nanotubes relative to said nanotube dispersion is in the range of from about 0.1 mg/ml to about 0.5 mg/ml.

9. The process of claim 1, wherein said contact pressure is about atmospheric pressure.

10. The process of claim 1, wherein said contact temperature is about the temperature of the polymer melt.

11. The process of claim 1, wherein said liquid is characterized as having a boiling point temperature greater than said contact temperature.

12. The process of claim 1, wherein said liquid is characterized as having a vapor pressure lower than atmospheric pressure at said contact temperature.

13. The process of claim 11, wherein said boiling point temperature is at least about 1° C. greater than said contact temperature.

14. The process of claim 11, wherein said boiling point temperature is at least about 3° C. greater than said contact temperature.

15. The process of claim 11, wherein said boiling point temperature is at least about 10° C. greater than said contact temperature.

16. The process of claim 11, wherein said boiling point temperature is at least about 20° C. greater than said contact temperature.

17. The process of claim 11, wherein said boiling point temperature is no more than about 50° C. greater than said contact temperature.

18. The process of claim 1, wherein said liquid comprises water.

19. The process of claim 18, wherein said liquid further comprises a surfactant, a dispersing agent, or any combination thereof.

20. The process of claim 1, wherein said liquid comprises an organic solvent.

21. The process of claim 20, wherein said organic solvent has a boiling point temperature in the range of from about 100° C. to about 25° C.

22. The process of claim 20, wherein said organic solvent is capable of solubilizing, dispersing, or suspending individual carbon nanotubes, carbon nanotube bundles, carbon nanotube ropes, or any combination thereof.

23. The process of claim 20, wherein said organic solvent comprises an alkane group, an aromatic group, a halogen atom, a nitrogen atom, a sulfur atom, an oxygen atom, or any combination thereof.

24. The process of claim 22, wherein said organic solvent comprises DMF, toluene, trichlorobenzene, or any combination thereof.

25. The process of claim 4, wherein said liquid is compatible with said polymer melt.

26. The process of claim 4, wherein said liquid is incompatible with said polymer melt.

27. The process of claim 4, wherein said polymer melt comprises a thermoplastic resin, a thermoplastic elastomer, a thermosetting resin, a radiation curable resin, a crosslinkable rubber precursor, an oligomer, or any combination thereof.

28. The process of claim 27, wherein said thermoplastic resin comprises an acrylic resin, a vinyl aromatic resin, a SAN resin, an ABS resin, a polyester resin, a polycarbonate resins, a PEEK resin, a halogenated resin, a polyamide resin, a polyacetal, a polyolefin, or any combination thereof.

29. The process of claim 4, wherein said mixing comprises compounding, kneading, blending, stirring, dispersing, shearing, or any combination thereof.

30. The process of claim 4, wherein said contacting comprises dripping, pouring, flowing, coating, injecting, spraying, or any combination thereof, of said nanotube dispersion onto said polymer melt.

31. The process of claim 4, wherein said nanotube dispersion is characterized as being a homogenous fluid.

32. The process of claim 31, wherein said homogenous fluid is characterized as having substantially no particles visible to the unaided eye.

33. The process of claim 31, wherein said homogenous fluid is characterized as having substantially no particles larger than about 100 microns.

34. The process of claim 4, wherein the concentration of said plurality of nanotubes relative to said nanotube dispersion is in the range of from about 0.1 mg/ml to about 0.4 mg/ml, wherein a 0.5 millimeter thick sample of said nanotube dispersion is characterized as being a homogeneous grey fluid.

35. The process of claim 4, further comprising sonicating said nanotubes in said liquid.

36. The process of claim 4, further comprising removing vaporized liquid from said nanotube composite melt.

37. The process of claim 36, wherein said nanotubes are incorporated in said polymer melt prior to said liquid being essentially completely vaporized.

38. The process of claim 4, further comprising increasing the temperature of said nanotube composite melt to effect removal of said liquid.

39. The process of claim 38, wherein the temperature of said nanotube composite melt is increased to a temperature greater than the boiling point temperature of said liquid.

40. The process of claim 4, further comprising extruding said nanotube composite melt to form a nanotube composite extrudate.

41. The process of claim 40, wherein said nanotube composite extrudate is in the form a film, sheet, fiber, tube, profile, rod, or any combination thereof.

42. The process of claim 4, further comprising melt spinning said nanotube composite melt to form a nanotube composite fiber.

43. A composition made according to the process of claim 1.

44. A process, comprising:
   sonicating SWNTs and DMF to form a substantially homogenous nanotube dispersion;
   contacting said nanotube dispersion with a polymer melt; and
   mixing said nanotube dispersion with said polymer melt to provide a nanotube composite melt; and
   removing vaporized liquid from said nanotube composite melt.

45. A process, comprising:
   sonicating SWNTs and toluene to form a substantially homogenous nanotube dispersion;
   contacting said nanotube dispersion with a polymer melt; and
   mixing said nanotube dispersion with said polymer melt to provide a nanotube composite melt; and
   removing vaporized liquid from said nanotube composite melt.

* * * * *

UNITED STATES PATENT AND TRADEMARK OFFICE
CERTIFICATE OF CORRECTION

PATENT NO. : 7,285,591 B2  Page 1 of 1
APPLICATION NO. : 10/805705
DATED : October 23, 2007
INVENTOR(S) : Karen Irene Winey et al.

It is certified that error appears in the above-identified patent and that said Letters Patent is hereby corrected as shown below:

Title Page,
Item (56) References Cited
OTHER PUBLICATIONS:
Col. 1, line 51, Page 2, "Karen I. Winey, oral slide presentation," reference, delete "Standarads" and insert -- Standards --.
Col. 1, line 67, Page 2, "Brandrup, et al. (Eds.)," reference, delete "Chapter VIII." and insert -- Chapter VII. --.
Col. 2, line 38, Page 2, "Halford, B.," reference, delete "81(5)," and insert -- 81(50), --.
Col. 2, line 46, Page 2, "Islam, M.F., et al.," reference, after "Nano Letts.," insert -- 2003, --.

Column 2,
Line 51, delete "$I_{90}°/I_0°$" and insert -- $I_{90°}/I_{0°}$ --.

Column 7,
Line 35, delete "an other" and insert -- another --.

Column 12,
Line 9, delete "~23'" and insert -- ~23° --.

Column 14,
Line 8, delete "50," and insert -- 5°, --.

Column 18,
Line 10, delete "25° C." and insert -- 250° C. --.

Signed and Sealed this

Eleventh Day of November, 2008

JON W. DUDAS
*Director of the United States Patent and Trademark Office*